Oct. 6, 1970 I. E. ROBB ET AL 3,531,971

CABLE INSULATION PIERCING CRIMP TOOL, TERMINAL, AND METHOD OF FORMING

Filed July 26, 1965 4 Sheets-Sheet 1

INVENTOR.
IAN E. ROBB
MARCY R. MALCOLM, JR
By Huebner & Worrel
ATTORNEYS.

INVENTOR.
IAN E. ROBB
MARCY R. MALCOLM, JR
By Huebner & Worrel
ATTORNEYS.

INVENTORS.
IAN E. ROBB
MARCY R. MALCOLM, JR.
By Huebner & Worrel
ATTORNEYS.

INVENTORS.
IAN E. ROBB
MARCY R MALCOLM, JR.
By Huebner & Worrel
ATTORNEYS.

United States Patent Office 3,531,971

Patented Oct. 6, 1970

3,531,971

CABLE INSULATION PIERCING CRIMP TOOL, TERMINAL, AND METHOD OF FORMING

Ian E. Robb, Newport Beach, and Marcy R. Malcolm, Jr., Glendale, Calif., assignors to International Telephone and Telegraph Corporation, New York, N.Y., a corporation of Delaware Filed July 26, 1965, Ser. No. 475,326
Int. Cl. B21d 13/02
U.S. Cl. 72—385 9 Claims

ABSTRACT OF THE DISCLOSURE

A plier-like tool has jaws which when clamped on the tubular shank of an electrical terminal squeezes the tubular shank about the wire to form a mechanical and electrical connection between the terminal and wire. Mechanical connection is made by squeezing the tubular terminal portion from opposite sides at points spaced along its length to produce a zigzag or sinusoidal outline. Electrical connection is made between the zigzag terminal portion and the wire therewithin by squeezing the terminal into tight engagement with the exposed wire. Where the portion of the wire inserted into the terminal is initially insulated, the pressure applied to form the zigzag also effects rupturing of the insulation and displacement of the bared wire into electrical contact with the conductive terminal.

The invention relates to a novel form of crimp tool, the terminal assembly formed thereby, and the method involved.

An object of the invention is to provide and use a novel crimp tool to produce an assembly of an insulated cable in the tubular portion of a crimp type terminal, without the necessity of stripping the insulation.

The crimp tool in its general aspects comprises a pair of relatively movable cradle blocks mutually contoured to position and support the tubular element of a terminal wherein the end portion of an insulated cable has been temporarily lodged, and opposing sets of pins or indentators staggered axially of the tubular element, with means to force the pins diametrically into the tubular element to indent the same on opposite sides in spaced but relatively close proximity, sufficient force being applied to break through and dislodge the insulation to expose the metal of the conductor for contact with the inner surface of the tubular element, and at the same time shaping the cable into a sinuous form thereby effecting an electrical contact between the conductor of the cable and the terminal and a mechanical attachment between cable and terminal. The mechanical attachment of the crimped tubular element is effected with both the metal of the conductor and the insulation thereof. The crimping pins are preferably rounded at the end in a hemispherical form so that they will not nick or cut through the wall of the tubular element, and also so that the indentations formed upon advancement of the pins are rounded rather than sharp, thus avoiding any nicking of the cable conductor and providing a relatively large surface contact between the exposed conductor and the wall of the tubular element. The diameter of the pins should be less than that of the tubular element so that true indentations are produced rather than a flattening or mashing of the element, and the over-all cylindrical profile of the tubular element is generally preserved.

Figures 1, 2, 3:
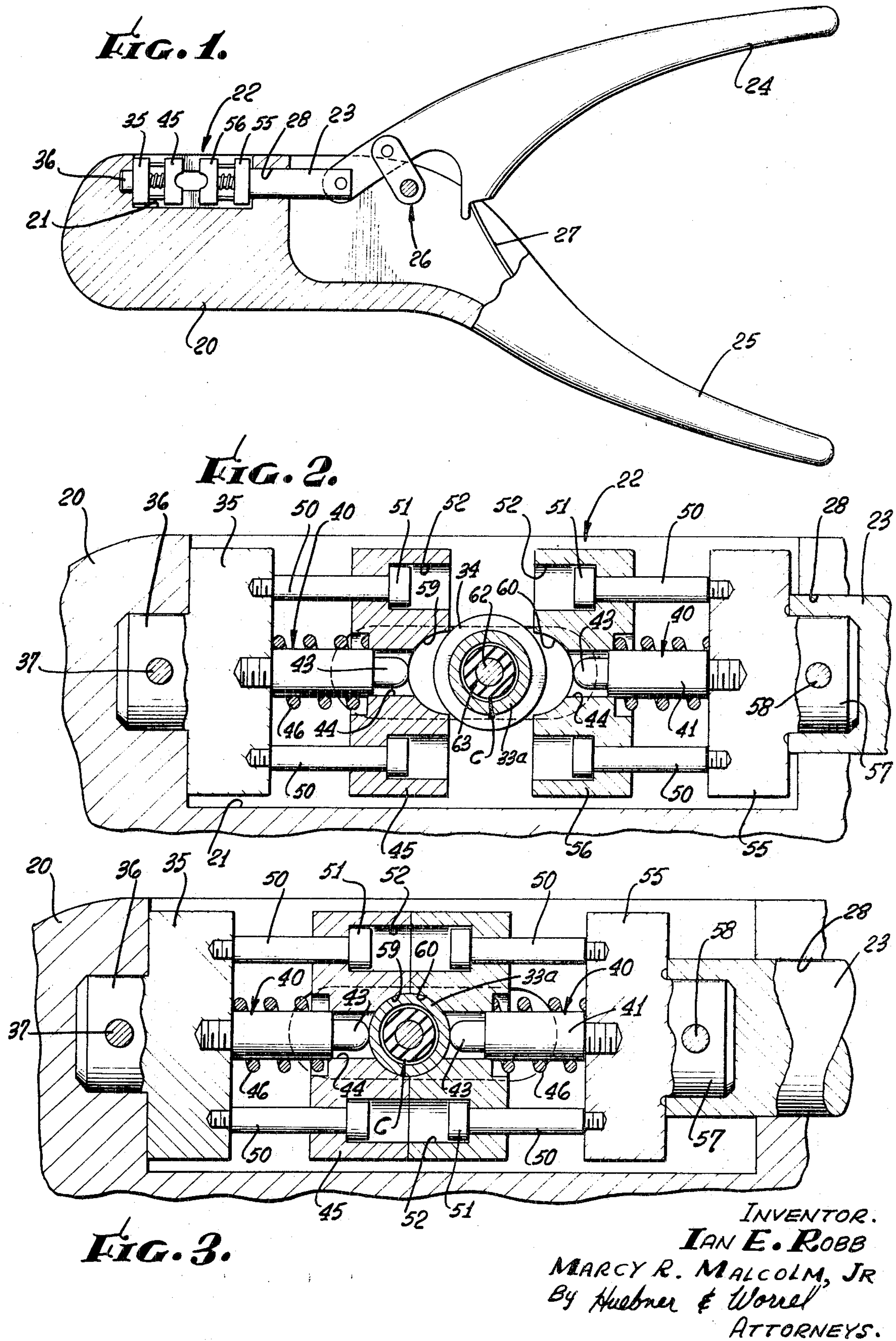
FIG. 1 is a side elevation of a crimp tool embodying the crimping mechanism.
FIG. 2 is an enlarged vertical section of the crimping mechanism with an insulated cable inserted in the tubular portion of the terminal taken along the lines 2—2 of FIG. 5.
FIG. 3 is a view similar to FIG. 2 with cradle blocks in positioning engagement with the tubular element of the terminal.

The device comprises a tool body 20 formed with a recess 21 for retaining a crimping mechanism 22 operated by an actuator bar 23. The actuator bar is shifted forwardly by squeezing together handles 24 and 25 which operate on the actuator bar through a toggle linkage 26, the handles being normally spread open by a spring 27. Any other suitable and convenient form of handles and linkage or other transmission may be employed by which actuator bar 23 or an equivalent can be advanced and retracted. This bar is slidably mounted in a bore 28 in the body 20.

A plate 30 covers one side of the recess 21, this plate being formed with an elongated slot 31 through which a contact end 32 of a terminal 33 may extend, but the slot is sufficiently narrow so that the plate functions as a positioning stop for a shoulder 34 on the terminal.

A die member 35 provided with a mounting stud 36 is fixedly secured in the body wall at one end of the recess as by a pin 37 driven through a bore 38. This die member threadedly mounts a plurality of crimping pins 40. These pins are formed with a relatively large diameter central section 41, providing a shoulder 42 at the mounting end, and tips 43 of reduced diameter at the crimping end. These tips 43 are preferably hemispherically rounded as illustrated. The intermediate section 41 of each pin is slidably sustained in a bore 44 in a cradle block 45. Compression springs 46 yieldably separate the die member 35 and the cradle block 45. The die member and block, however, are retained in proper orientation by guide bolts 50 preferably mounted in the die member 35, having enlarged heads 51 slidably engaging in bores 52 in the cradle block.

A movable die member 55 which may be identical to the die member 35 mounts crimping pins 40 which are identical to those on the opposite side, and a cradle block 56 is associated with the die member 55 in the same manner as on the opposite side of the mechanism. The die member 55 has a stud 57 which by means of a pin 58 is mounted in the end of the actuator bar 23.

The cradle blocks 45 and 56 are formed with mating semi-cylindrical channels 59 and 60 for positioning and supporting the external surface of a pot section or tubular element 33*a* of the terminal 33. The channels 59 and 60 are interrupted by the bores 44 through which the pins 40 advance. These bores in the block 45 are opposite those in the block 56 but are staggered axially of the bore formed by the combined channels 59 and 60. Thus a supporting wall segment 61 is presented opposite each pin 40.

In use a cable C made up of a conductor 62 covered by insulation 63 is inserted into the tubular element 33*a* of the terminal. This temporary assembly is then placed between the cradle blocks 45 and 56 in their spread apart relationship as shown in FIG. 2, with the terminal collar 34 placed against the plate 30 for proper registration.

Thereupon the actuator bar 23 is advanced by squeezing the handles 24 and 25 sufficiently so that the cradle block 56 moves toward the cradle block 45, and the tubular element 33*a* is firmly secured in position in the channels 59 and 60. The cradle block 45 does not move during the initial action of the actuator bar 23 but remains in the position shown in FIGS. 2 and 3 under the influence of the compression springs 46.

Figures 4, 5:
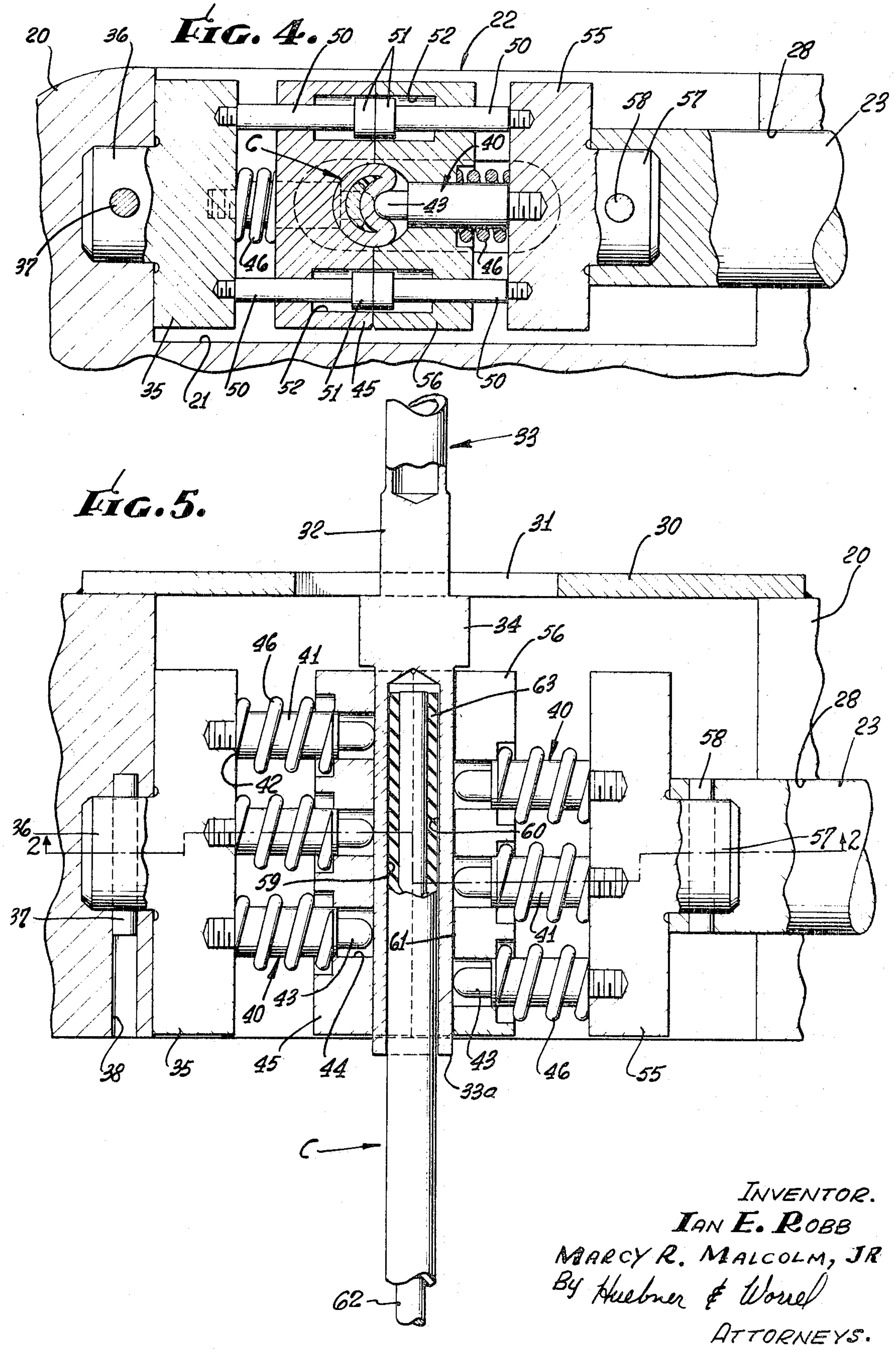
FIG. 4 is a view similar to FIG. 3 showing a crimping pin advanced against the tubular terminal element taken along the lines 4—4 of FIG. 6.
FIG. 5 is a horizontal section of the crimping mechanism with parts positioned as in FIG. 3.
Figure 6:
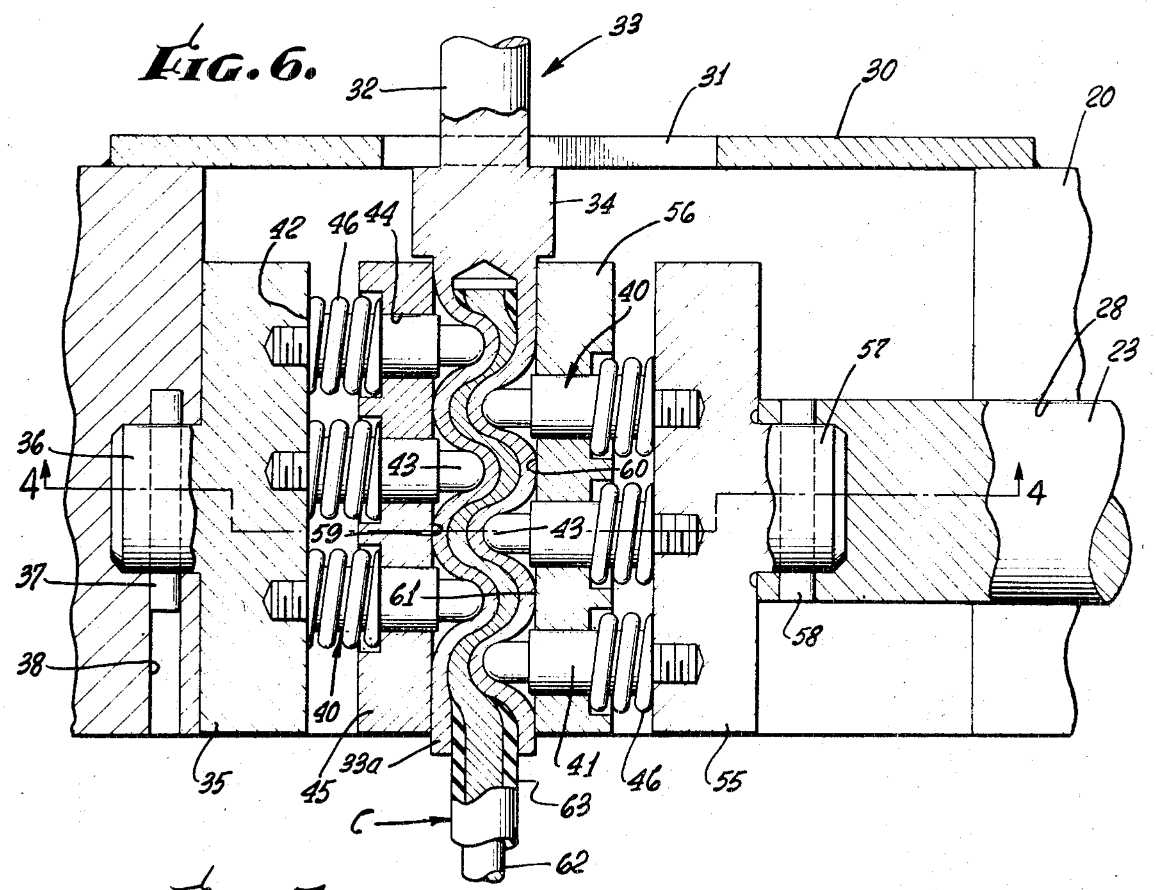
FIG. 6 is a view similar to FIG. 5 with the crimping pins advances as in FIG. 4.
Figure 7:
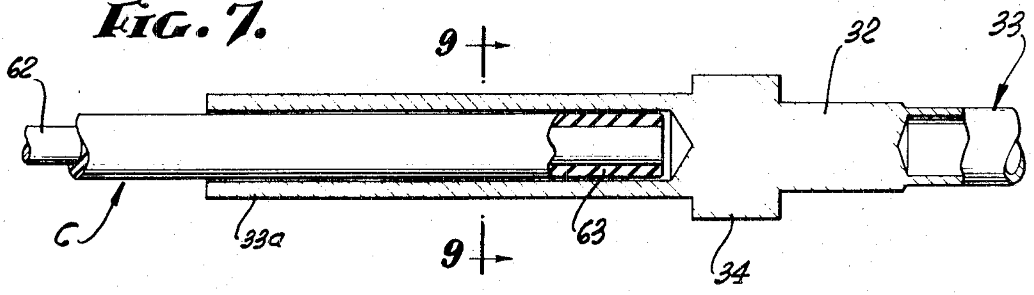
FIG. 7 is a longitudinal section of the terminal showing the insulated cable lodged in the tubular element of the terminal, as seen in FIG. 5.

Further advancement of the actuator bar 23 by continued and increased pressure on the handles 24 and 25 causes the die member 55 to advance against the yieldable resistance of the spring 46, the springs 46 on both sides of the mechanism becoming compressed and the cradle blocks shifting to the left as seen in FIG. 6. The pin tips 43 then indent the wall of the tubular element 33*a* as shown in FIGS. 4 and 6. These indentations are diametrically opposite and in the same plane, and are offset or staggered as shown. The relatively mutual advance of the two die members 35 and 55 is limited by abutting engagement of the heads 51 of the guide bolts 50. (See FIG. 4.) Preferably each pin advances to approximately the axis of the tubular element.

The identation in each case is such as to deform the wall of the tubular section inwardly in a dimple configuration. As the channel surface in the cradle block on the opposite side supports the opposite wall, it is obvious that deformation of the cable must occur, and inasmuch as the insulation is softer than the conductor the insulation is dislodged under the advance of the deformed wall which results in metal to metal or electrical conductive contact between the tubular element and the proximate conductor of the cable.

Inasmuch as the indentations on opposite sides are staggered, a sinuous pattern of a centralized portion of the tubular section and of the cable enclosed within it is formed, as particularly shown in FIG. 6. Thus, a permanent and wholly satisfactory mechanical retention of the cable in the terminal is obtained.

Figure 10:
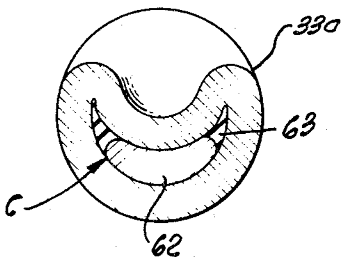
FIG. 10 is a cross-section taken on the line 10—10 of FIG. 8.

As seen in FIG. 10, the tendency in the central region of the crimped dimple is to push the insulation laterally away from the top and bottom sides of the conductor, crowding the insulation into lateral areas, while the conductor part of the cable is somewhat flattened out, the cavity and the deformed cable within it resembling in cross-section a crescent moon shape, the conductor itself having a general kidney shape.

Figure 11:
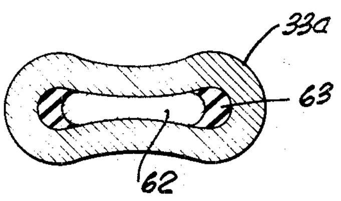
FIG. 11 is a cross-section taken on the line 11—11 of FIG. 8.
Figures 12, 13, 14, 15:
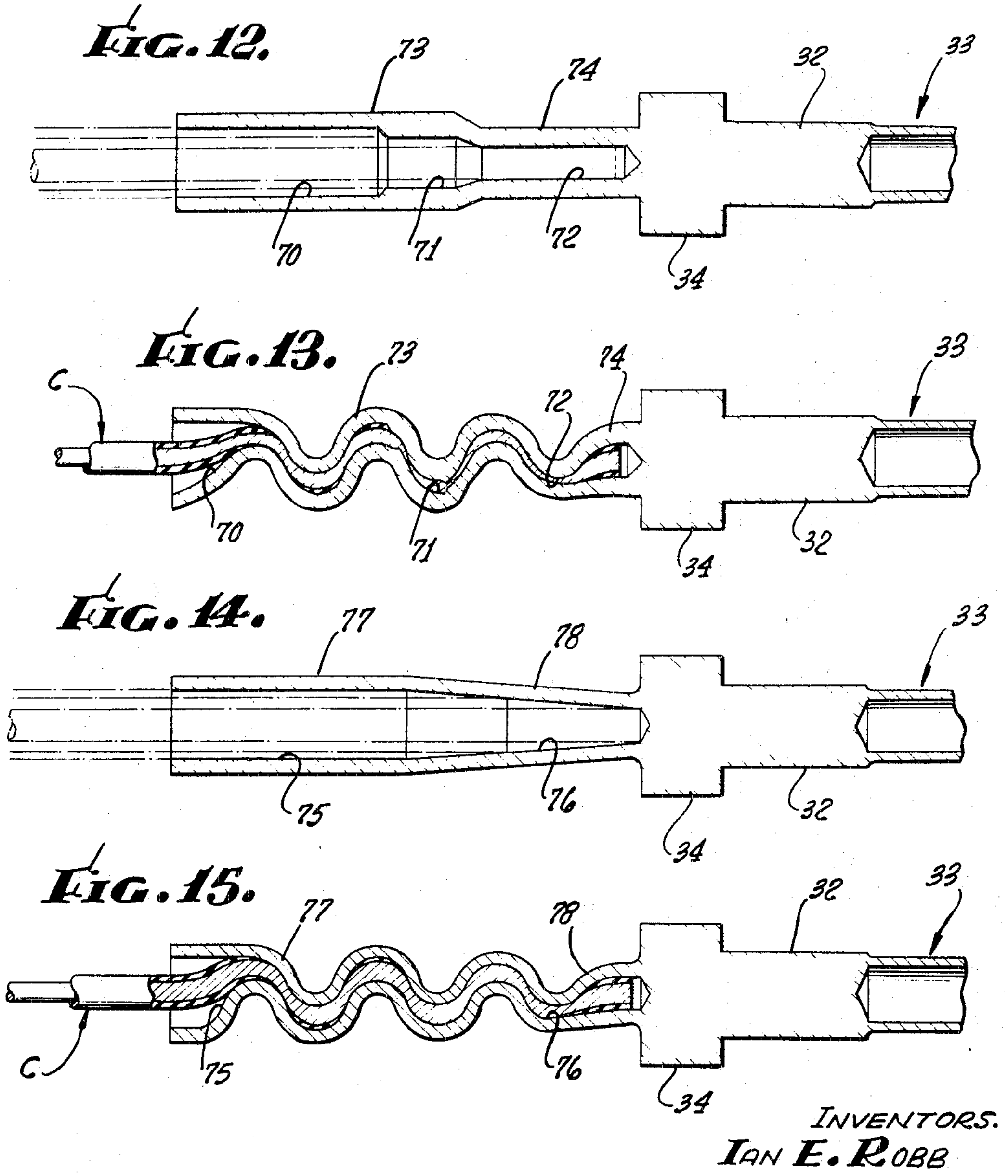
FIG. 12 is a longitudinal section of a second form of terminal and cable assembly prior to crimping, the tubular element having three different diameter bores for more conveniently accepting several different size cables.
FIG. 13 is a view similar to FIG. 12 with a cable crimped in the terminal.
FIG. 14 shows a third form of terminal featuring a modified bore in the tubular element.
FIG. 15 is a view of the form shown in FIG. 14 upon completion of the crimping operation.

In the region intermediate adjacent crimped dimples, as shown in FIG. 11, the tendency is again to push the insulation off of the conductor and to flatten out the conductor into somewhat of a dumbbell shape.

Thus, not only is good electrical contact made between the conductor and the terminal wall but the differing configuration in cross-section of the deformed cable as confined in the correspondingly different cross-sections of the tubular portion of the terminal member provides a series of mechanical obstructions against the withdrawal of the cable from the terminal in addition to the over-all sinuous configuration which is a major obstruction to separation.

The illustrations in FIGS. 1–11 have been described as exemplification of a terminal having a tubular or pot section of constant inside diameter in which a cable of only one general outside diameter is crimped with complete satisfaction. In FIGS. 12–15 modified forms are illustrated wherein, as in FIGS. 12 and 13, three stepped inside diameters 70, 71 and 72 and at least two outside diameters 73 and 74 are displayed and in FIGS. 14–15 one major inside diameter 75 and a tapering diameter 76 with corresponding outside diameters 77 and 78 are employed. With this construction cables of several sizes may be utilized in conjunction with a single terminal, and while the crimping will occur throughout most of the length of the tubular element, depending upon the number of crimping pins utilized, the progression of the crimped dimples into the cable will be fore effective in the immediate area while the cable approximately fits within the bore of the terminal. If forms of the character shown in FIGS. 12–15 are employed it is desirable to modify the semicylindrical channels 59 and 60 so that they conform to the outside diameter of the tubular elements. This will insure that wall support is provided in opposition to the entry force of the crimp pins.

Figure 8:
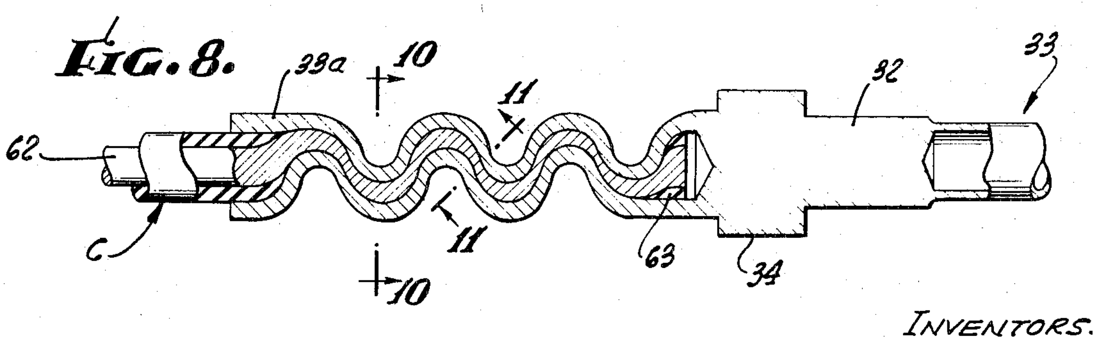
FIG. 8 is a longitudinal section of the crimped assembly of terminal and cable, as seen in FIG. 6.
Figure 9:
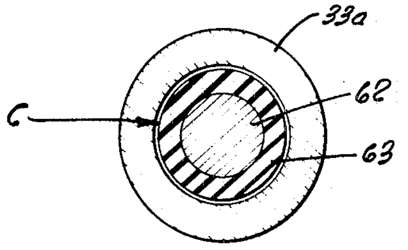
FIG. 9 is a cross-section taken on the line 9—9 of FIG. 7.

The relative diameter, length and spacing of the crimp pins may be varied. The illustration in the drawings represents a general relationship which has been found satisfactory. There, the axial offset of a pin on one side from the adjacent pin on the opposite side is such that when the pins are fully advanced, as shown in FIG. 6, with the result therein illustrated and confirmed in FIG. 8, the shortest line between two adjacent opposite pins as exemplified by the line 11—11 in FIG. 8 is slightly less than half the outside diameter of the original tubular element so that the cable will be deformed as illustrated, but the spacing is sufficient so that the cable will not be completely severed, its total cross-sectional area, at least of the conductor, being substantially retained throughout the crimping attachment.

Although we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent devices, methods and product.

We claim:

1. A crimping device comprising means for cradling a tubular electrical terminal element with a cable lodged therein, said cradling means comprising a pair of cradling blocks with directly opposed channels designed to mate with a workpiece opposing crimping die assemblies each including a pin aligned diametrically of the terminal element in the same plane and offset axially one from the other, and means for effecting relative mutual advancement of said pins with sufficient force to form opposed indentations in said terminal element, the inner walls of the terminal element at said indentations making contact with the conductor portion of the cable and shaping said conductor portion into a sinuous form extending between the indentations.

2. A device as defined in claim 1 wherein the diameter of the pins is less than the outside diameter of the terminal element.

3. A device as defined in claim 1 wherein the tips of the pins are of generally hemispherical form.

4. A device as defined in claim 1 wherein each crimping die assembly embodies a plurality of pins.

5. A crimping device comprising means for cradling a tubular electrical terminal element with a cable lodged therein, opposing crimping die assemblies each including a pin aligned diametrically of the terminal element in the same plane and offset axially one from the other, and means for effecting relative mutual advancement of said pins with sufficient force to form opposed indentations in said terminal element, the inner walls of the terminal element at said indentations making contact with the conductor portion of the cable and shaping said conductor portion into a sinuous form extending between the indentations, one of said crimping die assemblies being stationary and the other being moveable and the means for cradling the terminal element being shiftable upon movement of the moveable die assembly.

6. A device as defined in claim 5 wherein each die assembly includes a base, one being stationary and the other movable, and the pins are rigidly mounted in the respective bases.

7. A device as defined in claim 6 wherein the cradling means comprises cooperating jaw members, the pins slidably extend through the jaw members, and compression springs between the bases and the jaw members transmit relative advancement of the bases to the jaw members.

8. A device as defined in claim 6 in which the jaw members are formed with cooperating semicylindrical channels closely surrounding the terminal element and providing support for the wall of the latter diametrically opposite a pin.

9. A device as defined in claim 1 in which the diameter, stroke, and axial offset of the pins relative to the outside diameter of the terminal element is such that the conductor of the cable is flattened but not severed.

References Cited

UNITED STATES PATENTS

| | | | |
|---|---|---|---|
| 2,009,829 | 7/1935 | Williams ------------ | 72—385 |
| 2,741,834 | 4/1956 | Reed --------------- | 72—383 |
| 2,828,353 | 3/1958 | Adams et al. | |
| 3,156,514 | 11/1961 | Wing et al. | |

CHARLES W. LANHAM, Primary Examiner

M. J. KEENAN, Assistant Examiner

U.S. Cl. X.R.

72—401, 410